United States Patent [19]
Kano

[11] Patent Number: 5,815,282
[45] Date of Patent: Sep. 29, 1998

[54] CASSETTE HAVING COLOR-PRINTED RECESSED AND CONVEYED SURFACES

[75] Inventor: Kenichi Kano, Miyagi, Japan

[73] Assignee: Sony Corporation, Japan

[21] Appl. No.: 808,868

[22] Filed: Feb. 28, 1997

Related U.S. Application Data

[62] Division of Ser. No. 196,184, filed as PCT/JP93/00860 Jun. 24, 1993.

[30] Foreign Application Priority Data

Jun. 24, 1992 [JP] Japan .................................. 4-188914
Feb. 26, 1993 [JP] Japan .................................. 5-094823

[51] Int. Cl.$^6$ ............................. H04N 1/23; H04N 1/46; B41J 3/00; B41J 2/01
[52] U.S. Cl. ........................... 358/296; 358/502; 347/4; 347/105; 396/512; 206/387.1
[58] Field of Search .................... 358/296, 401, 358/502; 396/511, 512; 206/387.1; 427/265; 347/3, 4, 8, 9.15, 20, 43, 105, 106; 400/521, 719; 360/1, 2, 900, 131, 133, 134; 156/DIG. 5

[56] References Cited

U.S. PATENT DOCUMENTS

| | | | |
|---|---|---|---|
| 4,380,032 | 4/1983 | Pfost | 360/74.6 |
| 4,413,732 | 11/1983 | Louzil | 206/387 |
| 4,667,231 | 5/1987 | Pryor | 356/237 X |
| 4,741,930 | 5/1988 | Howard et al. | 346/1.1 |
| 4,814,795 | 3/1989 | Kuester et al. | 346/140 R |
| 4,849,630 | 7/1989 | Fukai et al. | 250/327.2 |
| 4,872,751 | 10/1989 | Hercher | 356/355 |
| 5,115,281 | 5/1992 | Ohtsuka et al. | 355/319 |
| 5,121,343 | 6/1992 | Faris | 250/558 X |
| 5,161,233 | 11/1992 | Matsuo et al. | 355/218 |
| 5,177,507 | 1/1993 | Ng | 346/157 |
| 5,193,918 | 3/1993 | Lohrmann et al. | 400/56 |
| 5,374,011 | 12/1994 | Lozarus et al. | 310/328 X |
| 5,410,335 | 4/1995 | Sawano et al. | 347/172 |

FOREIGN PATENT DOCUMENTS

| | | | |
|---|---|---|---|
| 51-42429 | 4/1976 | Japan | B41J 3/04 |
| 61-166600 | 10/1986 | Japan | H05K 13/02 |
| 63-239099 | 10/1988 | Japan | B41J 3/12 |
| 64-27953 | 1/1989 | Japan | B41J 3/04 |
| 23309 | 1/1990 | Japan | B41J 2/01 |
| 390283 | 4/1991 | Japan | B23K 9/127 |
| 3121853 | 5/1991 | Japan | B41J 2/13 |
| 357235 | 5/1991 | Japan | B41J 2/01 |
| 3182356 | 8/1991 | Japan | B41J 3/04 |
| 3222748 | 10/1991 | Japan | B41J 2/01 |

*Primary Examiner*—Eric Frahm
*Attorney, Agent, or Firm*—Ronald P. Kananen

[57] ABSTRACT

A cassette includes a cassette main member. The cassette main member has recessed and convexed surface regions on which color printing is formed. The color printing is formed by ejecting ink vertically downward from a series of three ink jet printing heads to form two printed layers and a third, protective layer. The first printed layer is a solid white base coating on which the second layer is printed. This second layer is full-color and is based on picture information. The third layer is formed over the full-color second layer and serves as a protective coating.

1 Claim, 17 Drawing Sheets

CASSETTE HAVING COLOR-PRINTED RECESSED AND CONVEYED SURFACES

This application is a division of application Ser. No. 08/196,184, filed as PCT/JP93/00860 Jun. 24, 1993.

BACKGROUND OF THE INVENTION

1. Field of the Invention

This invention relates to a printing method and a printing device having a printing head for full-color printing on objects made of paper or plastic such as cassettes, containers, or vessels for receiving objects. More particularly, this invention relates to a labeled cassette printing method and a printing device having a printing head for printing on objects having irregular non-planar outer surfaces.

2. Description of the Related Art

Frequently, cassettes used to enclose optical discs or magneto-optical discs, or tape cassettes which include magnetic tapes, are required to have company logo-marks or a variety of design patterns printed thereon for increasing their commercial value. Printing on these cassettes or the like type of containers, is carried out using offset printing or screen printing.

An original or manuscript on which a design to be printed on a cassette is drawn, and then color-separated by a color scanner.

Each color positive film is prepared depending on the color separation and a master is prepared for each color.

After calibration for each master, test printing is made on a cassette for adjusting the ink viscosity.

Printing is then carried out after registration of the respective color masters.

The majority of the above-mentioned printing processes are carried out manually by experienced operators. Nevertheless, fluctuations tend to be produced in picture pattern matching of white colors for solid printing, three prime colors, sepia or top coats, ink color modulation or ink viscosity adjustment. Further, difficulties occur in the master exchange or master registration operations for color matching, and further in that plural printing objects cannot be printed collectively. Since the masters need to be produced to suit the respective colors, production costs are unavoidably raised.

A further problem arises in that the cassettes are usually produced by injection molding of synthetic resin. Consequently, warps, bends or sinks are produced, although to a limited extent, due to contraction caused by cooling of the resin during injection molding. This reduces the planarity of the printing surface of the cassette and during solid full surface printing of the planar portion of the cassette, this slight warping, bending and like type of irregularities produce uneven contact with a transfer roll resulting in color fluctuations, color dropout or color blurring, and associated lowering the printing quality.

In order to overcome this problem it may be contemplated to raise the printing transfer pressure so as to improve the contact of the transfer roll with the cassette. However, if the transfer pressure is raised, the rubber layer of the transfer rubber roll layer is distorted and causes distortion in the printed images or letters. In addition, lettering on the like tends to be contaminated due to the elevated transfer pressure at the time of resetting of the deformed cassette, thereby markedly lowering the printing quality. Additionally, this pressure can cause cracks or printing interruptions depending on the type of the cassette material. Thus, printing is accordingly limited to the planar portions of the cassette.

Recently, it has been proposed to use ink jet type printing for forming printing on cassettes.

In accordance with this proposal, a horizontal injection type ink jet printing head is used for injecting the ink in the horizontal direction to avoid the problem wherein the casing for housing the printing object therein becomes contaminated by ink dripping into its interior. With this printing technique, a printing object 101 is transported in the vertical direction by a transport unit including of an electric motor 103. The ink is jetted onto the moving object in the horizontal direction as shown in FIG. 1. The printing object 101 shown herein is illustrated as being tape-shaped.

The standard size cassette has a planar portion, a recessed area for labelling, a convexed area, chamfered curved or inclined portions or the like, including warping during molding with synthetic resin or the molding tolerances being set to ±0.3 mm. Consequently, the difference between the recessed and convexed surfaces on the cassette surface is 3 mm, so that, when printing is made on the cassette surface, the optimum gap length, or a gap g between the cassette 101 and a printing head 102, is 2 to 4 mm.

However, with the printing head 102 used in the horizontal jetting type system, if the gap length g is set to 2 to 4 mm, the trajectory of the jetted ink particles exhibit a curved trajectory so that the impact position is lower than a pre-set target position. This produces distortions in the picture pattern and deteriorates the printing quality.

Consequently, the gap length Q from the printing object 101 at the time of single-color or multi-color printing on the printing object 101 has to be set so as to be less than 0.5 mm, because of the above-mentioned trajectory characteristics of the ink jet. Printing therefore may be made only on planar portions of cassettes, and cannot be made on the remaining areas, such as the recessed surfaces for labelling, convexed surfaces, R-surfaces or inclined surfaces.

SUMMARY OF THE INVENTION

It is therefore an object of the present invention to eliminate the above-mentioned technical difficulties and to provide a labeled cassette wherein the label is directly printed on the cassette using a printing method, a printing device having a printing head which eliminates the need for mastering and ink color or ink viscosity adjustment, and which enables high quality printing to be carried out from the outset without the necessity of test printing.

It is another object of the present invention to provide a labeled cassette wherein the label is directly printed on the cassette using a printing method whereby the gap between the printing object and the printing head may be set sufficiently wide to permit printing on the surface of the printing object irrespective of whether or not the surface is planar or not.

It is yet another object of the present invention to provide a printing method whereby printing can be carried out irrespective of differences in the hardness of the cassette and continuous printing can be achieved from planar areas over recessed or convexed areas, inclined areas or curved areas of the printing object.

SUMMARY OF THE INVENTION

According to one embodiment, the present invention is directed to a cassette including a cassette main member having a recording medium housed therein. The cassette main member has recessed and convexed areas on a surface on which printing is to be formed. A first printed layer is formed continuously between upstanding wall sections of the recessed and convexed areas of the cassette main member and bottom surfaces of the recessed areas or top surfaces of the convexed areas The first printed layer is formed by ejecting ink vertically downward from a first ink jet printing head. A second printed layer is formed on the first layer using color printing based on picture information indicative of the color printing to be formed. The second printed layer is formed by ejecting ink vertically downward from a second ink jet printing head. A third, protective, layer is formed over the second printed layer by ejecting ink vertically downward from a third ink jet printing head.

The above summary of the invention is not intended to describe each illustrated embodiment or every implementation of the present invention. The figures and the detailed description that follow more particularly exemplify these embodiments.

With the printing method according to the present invention, the signals read by an image reader are transformed into a preset picture and the resulting information transformed into the picture is supplied to a non-contact type printing head. Alternatively, the replay signals reproduced from a recording medium on which the picture information has been recorded are processed for conversion into a pre-set picture, and the information thus converted into the picture is supplied to the contact-free printing head for printing on the printing object. Consequently, the respective color masters hitherto employed are transformed into picture outputs, as a result of which the laborious operation of mastering, registration of the respective color masters, ink color modulation or ink viscosity adjustment, may be eliminated to improve productivity and reduce the costs. On the other hand, since the output is the picture information, high-quality printing may be achieved from the outset without the necessity of test printing.

Besides, since the printing head is not contacted with the printing object, high-quality printing may be achieved even if the printing object has defects such as warping, bending or irregularities. Consequently, color fluctuations, color extinction or blurred letter edges are not produced.

In particular, since the vertical ejection type ink-jet printing head is employed as the non-contact printing head, the so-called drop curve is not exhibited by the flight trajectory of the ink particles. Consequently, if the printing head 8 is fixed relative to the cassette 14, the image or picture such as picture patterns or letters may be printed satisfactorily on the printing surface of the cassette 14, inclusive of planar surfaces, recessed surfaces for labels, convexed surfaces, R-surfaces or inclined surfaces.

On the other hand, with the printing device according to the present invention, since the non-contact printing head is adapted to vary the distance to the printing object based on the detection output of the detection unit for detecting surface irregularities of the printing object, printing may be made on the printing object while a constant distance is maintained despite warping, bending or irregularities on the surface of the printing object. Consequently, printing may be made continuously from the planar surfaces onto the recessed surfaces, convexed surfaces, inclined surfaces or curved surfaces without producing color fluctuations, color extinction or blurred letter edges.

Further, with the printing head according to the present invention, since detection means are provided in the non-contact printing head for detecting irregularities on the printing object, it is possible to control the height of the printing head relative to the printing object depending on the state of irregularities on the printing object.

With the printing method for labeling cassettes according to the present invention, since the picture information is processed in a pre-set manner for conversion into pre-set pictures and printing is made on the cassette surface by the non-contact printing head based on the information thus converted into pictures, high-quality printing may be achieved even if the printing object has defects such as warping, bending or irregularities, while no external pressure is applied to the cassette.

DESCRIPTION OF THE PREFERRED EMBODIMENTS

Figure 1:
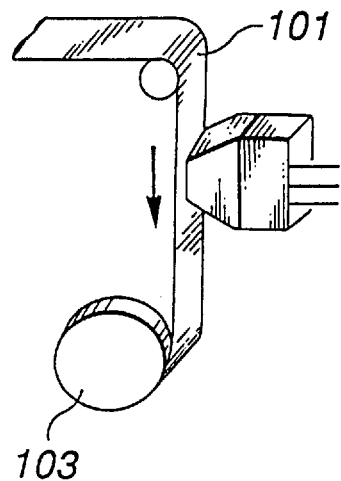
FIG. 1 is a schematic perspective view showing an example of printing using a conventional ink-jet printing head of the horizontal jet type.
Figure 2:
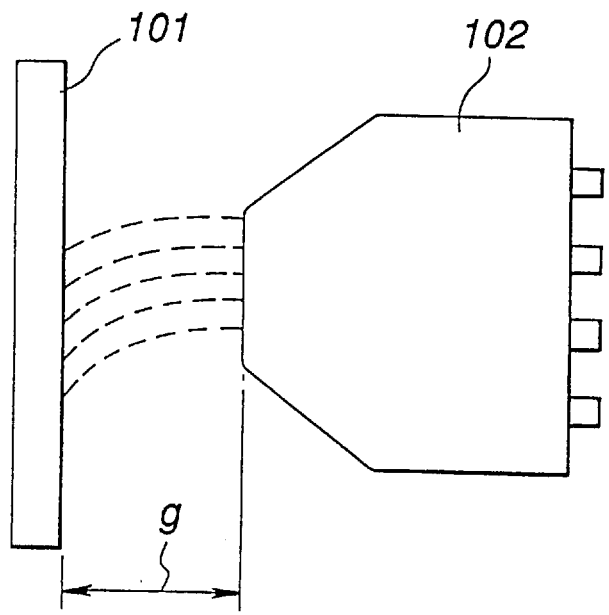
FIG. 2 is a schematic side view showing a drop-curve phenomenon of the trajectory of ink particles which occurs with in the conventional horizontal jet type ink-jet printing head.

Referring to the drawings, the preferred embodiments of the present invention will now be explained in detail. In the present embodiment, the present invention is applied to a printing system in which full-color printing is made on designated portions of a printing object.

Figure 3:
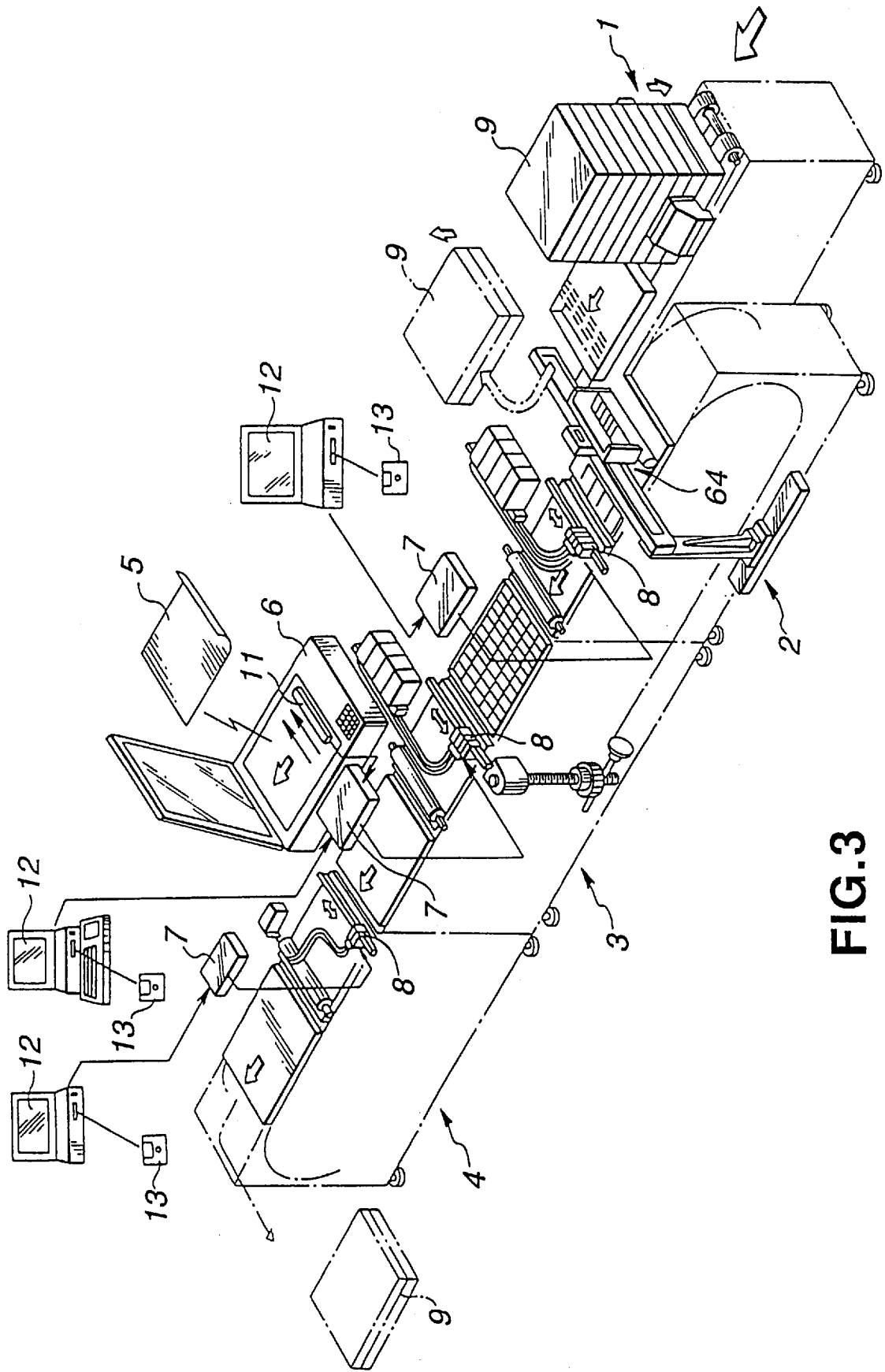
FIG. 3 is a perspective view showing the printing system in its entirety.

With the printing system of the present embodiment, so-called white solid coating is made on a plurality of cassettes by way of surface preparation, full-color printing is then made with three prime colors and ultimately a protective film is formed by way of top coating. The present printing system is made up of a supply section 1 for printing objects into which plural cassettes are charged, a solid printing section 2 in which white solid printing is made, a printing section 3 for full-color printing is made, and a printing section 4 in which top coating is made, as shown in FIG. 3.

With the present printing system, the printing section 2 for making white solid printing, the printing section 3 for full-color printing and the printing section 4 for top coating are essentially similar in construction and arrangement. Of these sections, the printing section 3 for full-color printing is crucial. Consequently, the following description is made of the printing section 3.

Figure 4:
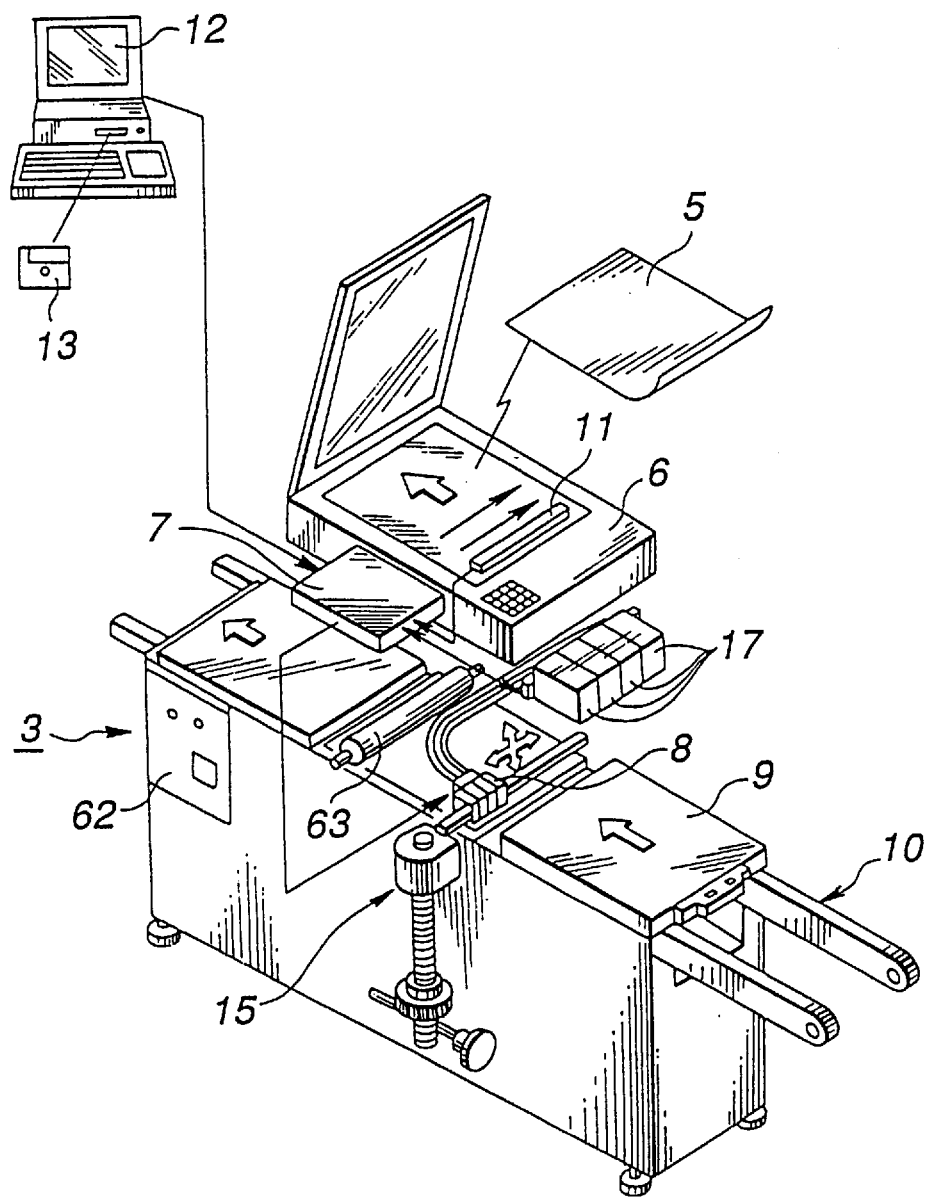
FIG. 4 is an enlarged perspective view showing a full-color printing section.

The printing section 3 for full-color printing is made up of an image reader unit 6, an image processing unit 7, a printing head 8 and a transporting unit 10, as shown in FIG. 4. The image reader 6 reads the picture information of a design manuscript 5. The image processing unit 7 transforms the signals as read by the image reader unit 6 into a pre-set picture. The printing head 8 is a non-contact printing head operated by the information transformed in a pre-set manner into pictures by the image processing unit 7. The transporting unit 10 transports a tray-like container or container vessel 9, having plural cassettes housed therein, in synchronism with the printing head 8, by an output signal from the image processing unit 7.

The image reader unit 6 includes a scanner 11 having picture reading elements, such as color CCDS. Using this scanner 11, the picture information of a design original or manuscript 5, on which pre-designed color patterns are drawn, is read, and color-separated from one pixel to another into R, G and B. As the design manuscript 5, an 8-pattern picture design drawn on an A-4 format copy paper sheet is employed, if printing is made on a video cassette having a tape with a tape width of 8 mm housed therein. As the manuscript 5, a 16-pattern picture design drawn on an A-4 format copy paper sheet is employed, if printing is made on a small-sized magneto-optical disc having a diameter of 64 mm. The picture patterns are drawn on the design manuscript 5 in a number corresponding to the number of the cassettes printed simultaneously. The image reader unit 6 reads the picture information drawn on the manuscript 5 by moving the scanner 11 along the length of the design manuscript 5.

Meanwhile, the design pattern may be directly drawn by graphic designing using a word processor or a computer 12. Alternatively, the pre-designed picture information or the picture information may be stored on a magnetic disk cartridge 13, such as a floppy disk. If the design pattern is drawn by graphic designing by the computer 12, the picture information is directly outputted on the image processing unit 7 from the computer 12. If, on the other hand, the picture information is stored on the magnetic disk cartridge 13, the magnetic disk cartridge 13 is introduced into the magnetic disk drive provided in the computer 12 for reading out the information stored in the magnetic disk cartridge 13. The information stored in the magnetic disk cartridge 13 is reproduced and outputted at the computer 12 and subsequently outputted at the image processing unit 7. This obviates the necessity of preparing the design manuscript 5 and reduces the reading time significantly.

The R, G and B color manuscript digital signals, color-separated from pixel to pixel by the image reader unit 6, are color-separated by the image processing unit 7 for R, G and B, and the color-separated printing data is stored in the memory of the image processing unit 7. The image processing unit 7 reads the color-separated digital signals from the memory, which are outputted to the printing head 8 as later explained. The image processing unit 7 outputs an operating signal to the transporting unit 10 in synchronism with the movement of the printing head 8.

Figure 5:
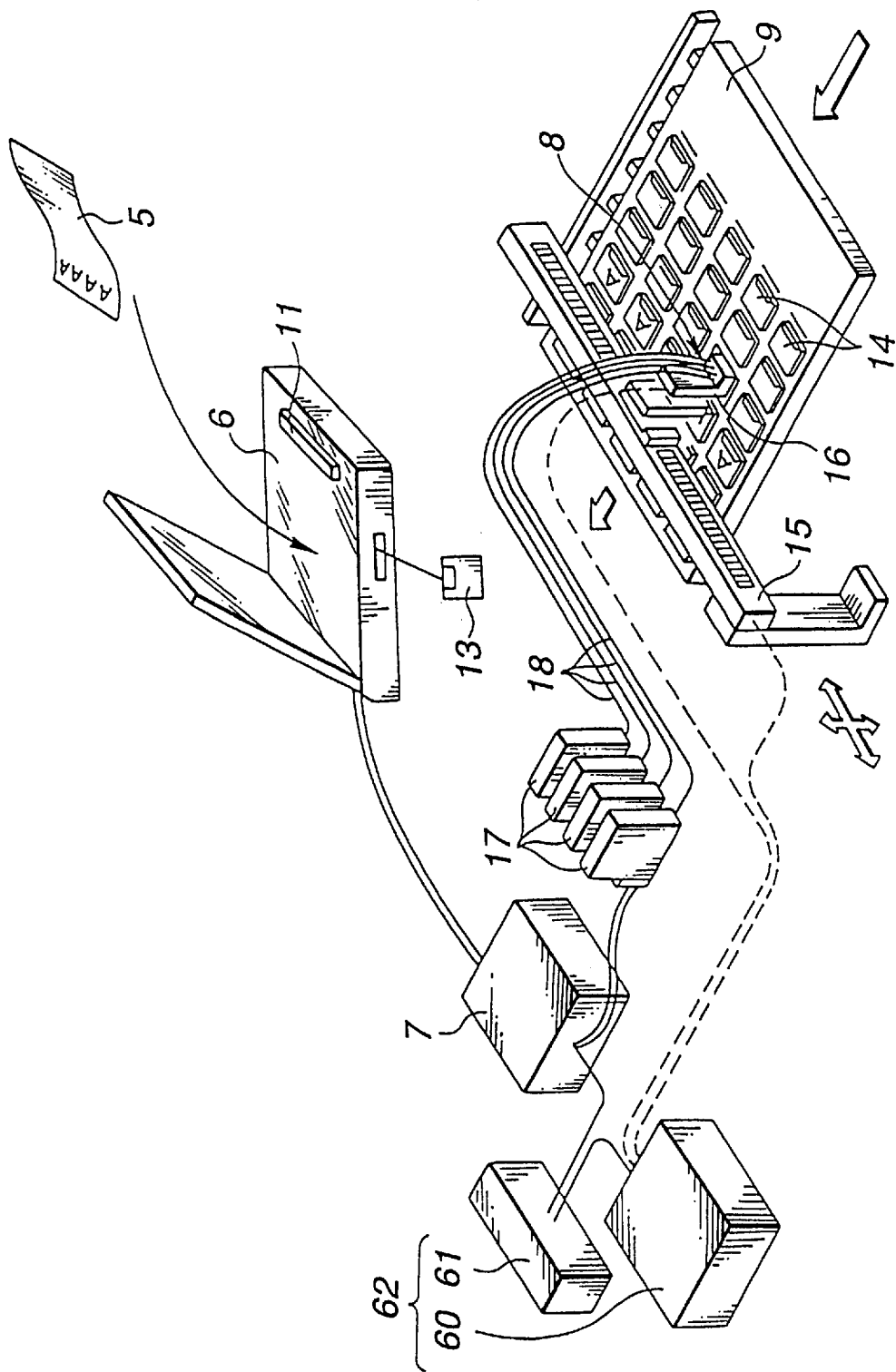
FIG. 5 is a perspective view showing a printing head part of the full-color printing section.

The printing head 8 is a so-called vertical jet type ink-jet printing head for printing a cassette 14 lying directly below the printing head 8 in a non-contact manner by jetting the ink downwards from the distal end of e.g. a fine nozzle. The printing head 8 performs full-color printing on designated portions of the cassette responsive to the color-separated digital signals outputted by the image processing unit 7. The printing head 8 is mounted on a head actuating unit 15 adapted for moving the printing head 8 in the vertical direction and in the left-and-right direction with respect to the plural cassettes 14 contained in the container vessel 9, as shown in FIG. 5. As a result thereof, the ink is ejected from the distal end of the nozzle provided in a head unit 16 of the printing head 8 for performing full-color printing on the designated portions of the cassette 14. The distance between the nozzle surface of the printing head 8 and the label area of the cassette, which is the planar surface destined for printing, is selected to be approximately equal to 5 mm.

The printing head 8 is connected by ink pipes 18 with ink tanks 17 respectively containing inks of the three prime color inks of cyan, magenta and yellow and sepia as black. The ink pipes 18 which lead from the respective ink tanks 17 are connected to nozzles provided in the head unit 16 of the printing head 8. The ink tanks 17 are connected to the image processing unit 7 and are driven in response to the color-separated digital signals or the printing data supplied from the memory of the image processing unit 7 for supplying the inks to the respective nozzles.

Since the printing head 8 is of the vertical ink-jet type and ejects ink vertically downward, the trajectory of the ink particles does not exhibit a drop curve, so that, even if the printing head 8 is secured to the cassette 14, printing of pictures or letters on the surfaces of the cassettes 14, in other words, the planar cassette surfaces, recessed surfaces for labelling, convexed surfaces, R-surfaces or the inclined surfaces, may be achieved satisfactorily.

In the present embodiment, a unit is provided for shifting the printing head 8 in the vertical direction along the surface of the cassette 14 for improving the printing quality of the picture printed on the cassette 14. This unit is made up of the printing head actuating unit 15 and a shape detection unit for detecting the recesses or crests on the cassette 14 in the manner explained later.

Figure 7:
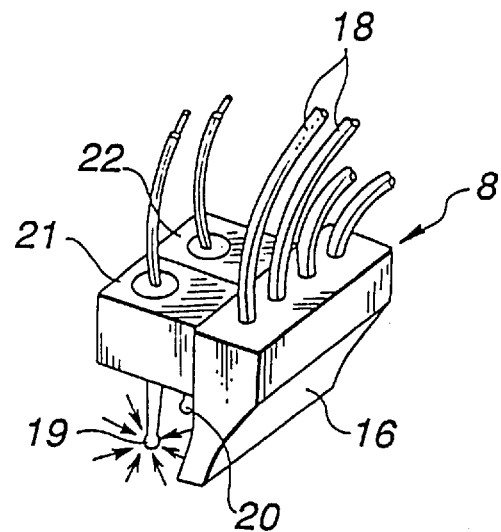
FIG. 7 is an enlarged partial perspective view showing a printing head provided with a profile sensor.
Figure 8:
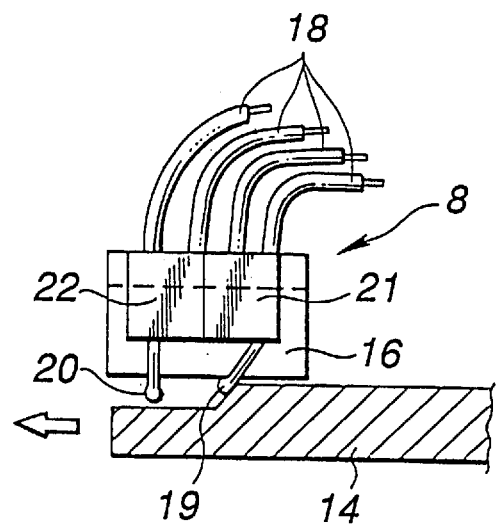
FIG. 8 is an enlarged partial side view showing printing by the printing head provided with the profile sensor.

The shape detection unit is provided in the printing head 8 and, as shown for example in FIGS. 7 and 8, includes a pair of profile sensors 21, 22 having contactors 19, 20, adapted for contacting the surface of the cassette 14. These profile sensors 21, 22 are secured to the head unit 16 in a row with respect to the travelling direction of the cassette 14, with the distal ends of the contactors 19, 20 being projected from the ink jet surface of the head unit 16.

The contactors 19, 20 are adapted for omnidirectional deflection in an angular range of 360°, and are adapted to contact the surface of the cassette 14 and to analog detection signals indicative of the recesses and crests of the cassette surface, to a system controller which will be explained subsequently. The printing head actuating unit 15 is actuated under instructions from the system controller on the basis of the detection signals from the contactors 19, 20 for controlling the position along the height of the printing head 8. In this manner, the distance of the printing head 8 from the cassette 14 may be maintained constant at all times irrespective of whether the surface is planar, recessed, convexed, inclined or curved. This enables continuous high-quality printing from the planar surface to the convexed or recessed surface, inclined surface or a curved surface in a manner free from color fluctuations, color extinction or blurred letter edges. Besides, since the printing head 8 is not contacted with the cassette 14, printing may be made in a finished state without the necessity of applying an external pressure to the cassette 14.

Figure 9:
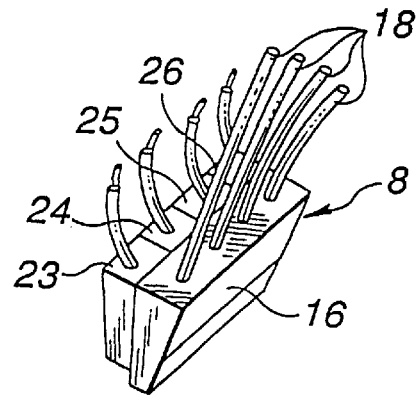
FIG. 9 is an enlarged partial perspective view showing a printing head provided with a laser displacement sensor.
Figure 10:
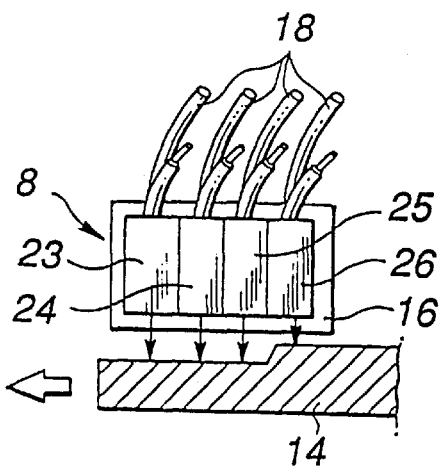
FIG. 10 is an enlarged partial side view showing printing by the printing head provided with the laser displacement sensor.

As the shape detection device for detecting surface irregularities of the cassette 14, any of the laser displacement, ultrasonic or the photo-electric type sensors, may be employed. As an example of the laser displacement sensor, four laser displacement sensors 23 to 26 are secured in a row in the travel direction of the cassette 14, as shown in FIGS. 9 and 10. By so doing, digital detection signals corresponding to the surface irregularities of the cassette 14 may be outputted from the laser displacement sensors 23 to 26. By outputting detection signals from the displacement sensors 23 to 26 to the system controller, the printing head actuating unit 15 is actuated under commands from the system controller based on the detection output for controlling the printing head position along its height.

Figure 11:
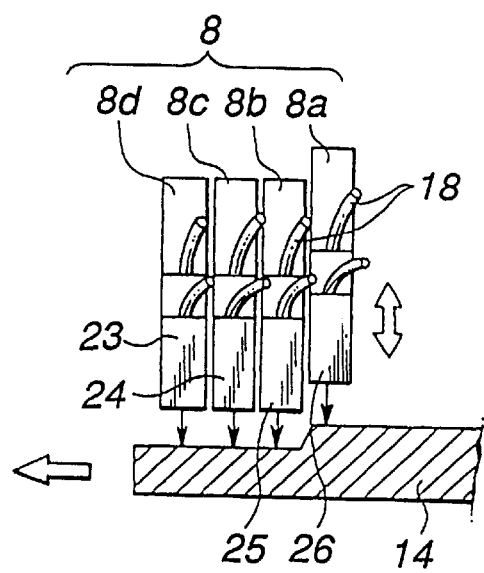
FIG. 11 is an enlarged partial side view showing printing by the printing head provided with a plurality of laser displacement sensors.

It is also possible to provide the laser displacement sensors 23 to 26 for the printing heads 8a, 8b, 8c and 8d for the respective colors, respectively, and independently control the positions of the printing heads 8a to 8d along the height thereof relative to the cassette 14 based on the detection signals from the laser displacement sensors 23 to 26, as shown in FIG. 11.

Figure 12:
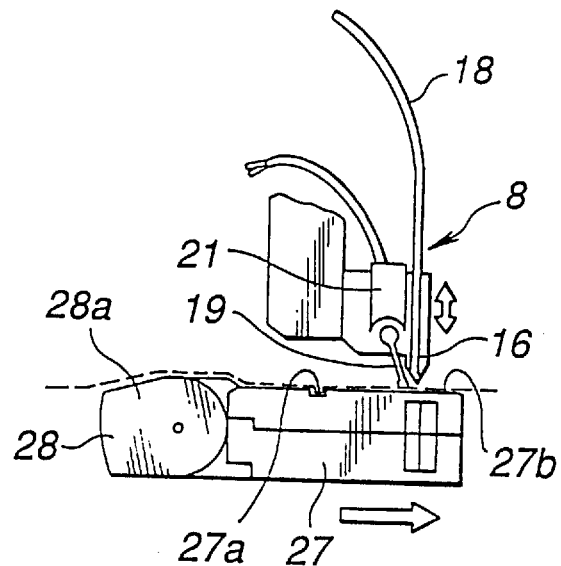
FIG. 12 is a side view showing printing on a video cassette by the printing head provided with the profile sensor.

By providing the shape detection device in the printing head 8 for detecting the surface irregularities of the printing object, high-quality printing may be made for any shape of the printing object and irrespective of whether the printing object is hard or soft. For example, if the printing object is a video tape cassette 27 having an 8-mm tape housed therein, printing may be made continuously from a curved surface 28a of a lid 28 onto a recessed surface 27a and a planar surface 27b of the cassette main member, as the position of the printing head 8 along its height relative to the video tape cassette 27 is controlled by the profile sensor 21, as shown in FIG. 12.

Figure 13:
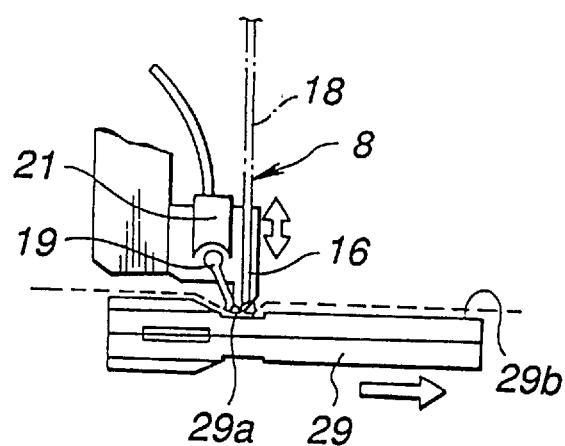
FIG. 13 is a side view showing printing on a tape cassette by the printing head provided with the profile sensor.

Similarly, if the printing object is an audio cassette 29, printing may be made continuously from a recessed surface 29a onto a planar surface 29b of the cassette main member, as the position of the printing head 8 along its height relative to the audio cassette 29 is controlled by the profile sensors 21, 22, as shown in FIG. 13.

Figure 14:
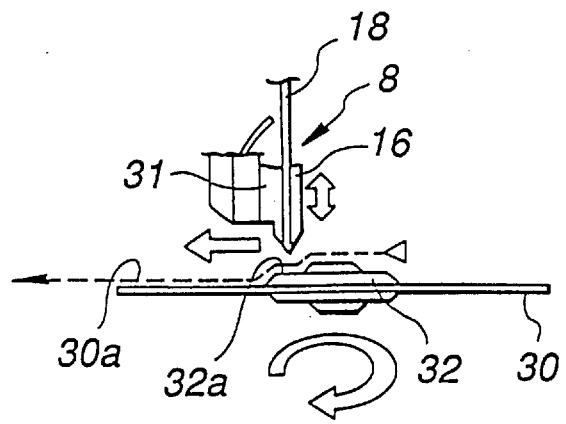
FIG. 14 is a side view showing printing on a disc by the printing head provided with the laser displacement sensor.

On the other hand, if the printing object is a disc-shaped object, such as an optical disc or a magneto-optical disc, printing may be made continuously from a planar recording surface 30a of a disc 30 onto a recessed and convexed surface 32a of a disc hub 32, as the position along the height of the printing head 8 relative to the disc 30 is controlled by a non-contact sensor 31, such as an ultrasonic sensor or a photoelectric sensor, as shown in FIG. 14.

Figure 15:
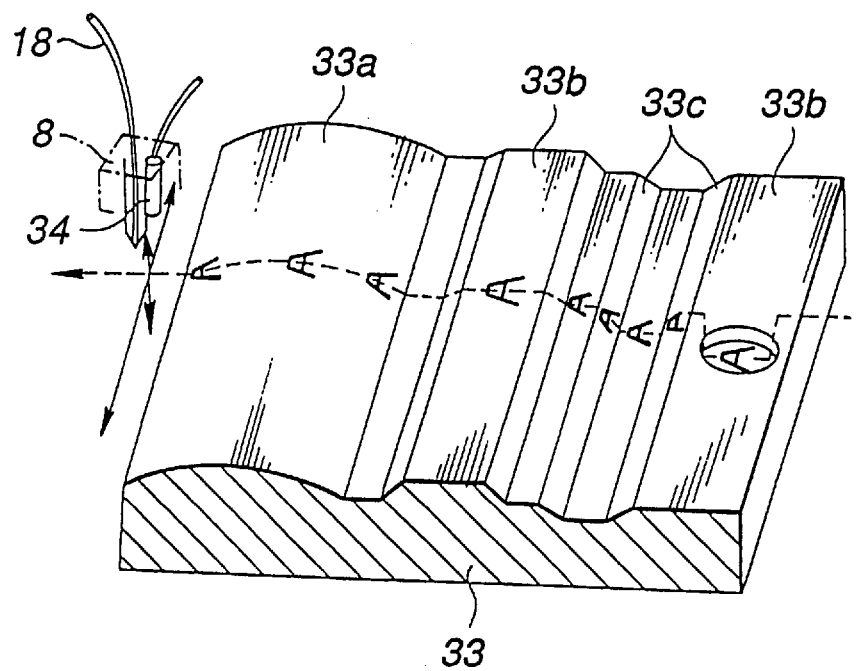
FIG. 15 is a perspective view showing printing on a profiled printing object by the printing head provided with the laser displacement sensor.

If the printing object is a profiled sheet of plastics having a curved surface 33a, a recessed and convexed surface 33b and an inclined surface 33c mixed together, as shown in FIGS and 16, printing is made in the following manner. The position of the printing head 8 along its height relative to a plastic sheet 33 is controlled by a non-contact sensor 34 of the type employing an ultrasonic sensor or a photo-electric sensor, and printing is made continuously from the curved surface 33a onto the recessed and convexed surface 33b and the inclined surface 33c of the sheet 33 by the printing head 8. Meanwhile, a letter A is printed with the example shown in FIGS. 15 and 16.

Figure 17:
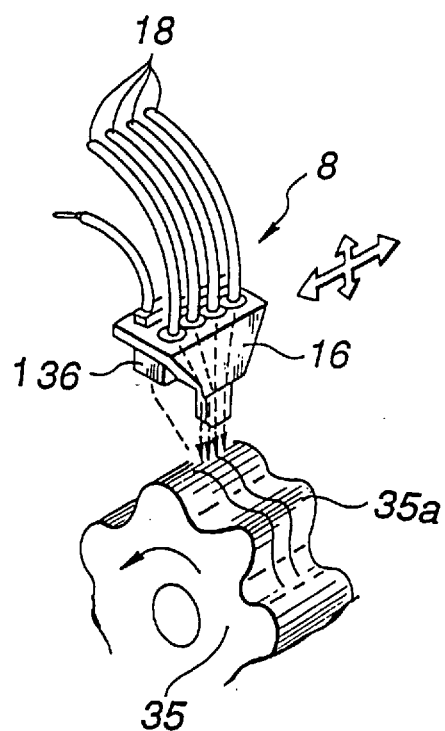
FIG. 17 is a perspective view showing printing on a gear by a printing head provided with the displacement sensor.

If the printing object is a gear 35 as shown in FIG. 17, printing is made continuously on a curved surface 35a of each tooth of the gear 35 by the printing head 8 as the position of the printing head 8 along its height relative to the gear 35 is controlled by a non-contact sensor 136 of the type employing the ultrasonic sensor or the photoelectric sensor.

Figure 18:
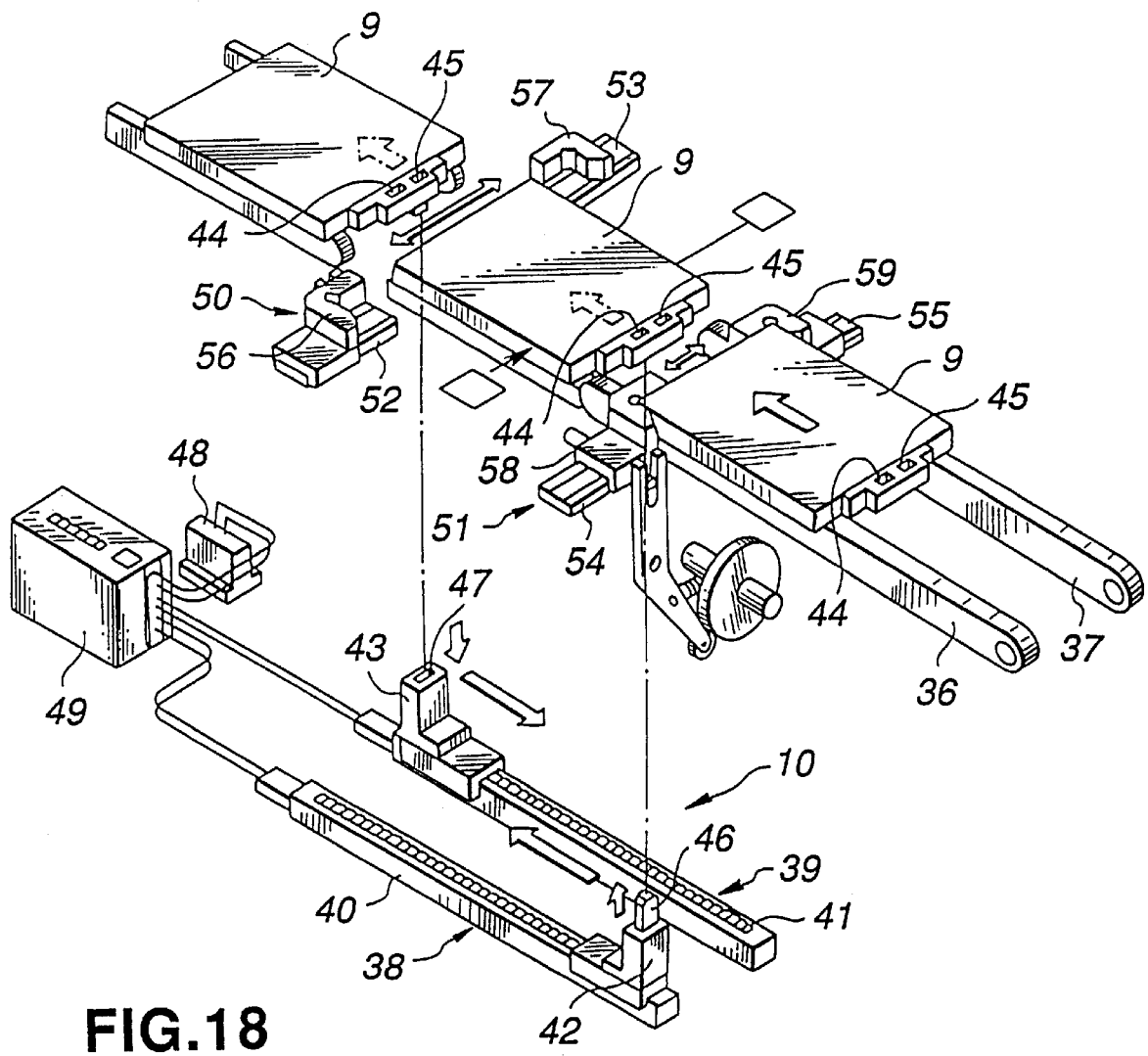
FIG. 18 is an exploded perspective view showing the construction of a transport section.

On the other hand, the transporting unit 10 is responsive to an actuating output signal from the image processing unit 7 to transport the container vessel 9, having plural cassettes 14 housed therein, in synchronism with the scanning of the printing head 8. The purpose of synchronizing the transport of the container vessel 9 with the scanning of the printing head 8 is to enable high quality printing. The transport unit 10 includes feed sections 38, 39 for transporting the container vessels 9 along a pair of transport rails 36, 37 mounted parallel to and at a pre-set distance from each other as shown in FIG. 18.

The feed sections include a pair of feed rails 40, 41 mounted below and parallel to the transport rails 36, 37 and a pair of sliders 42, 43 slidably mounted on the feed rails 40, 41. The sliders 42, 43 are provided with tray feed hooks 46, 47, respectively, engaged in feed hook holes 44, 45 formed in the container vessels 9, respectively. These tray hooks are provided for performing a vertical reciprocating movement with respect to the sliders 42, 43, respectively. That is, the tray feed hooks 46, 47 are protruded from the sliders 42, 43 for being engaged with the hook holes 44, 45 for feeding the container vessels 9 to the top coat printing section 4 of the next stop, respectively, while being receded from the sliders 42, 43 otherwise, respectively.

The feed sections 38, 39, constructed in the manner above, are controlled by a sequencer 48 and a controller 49. When the container vessel 9, having housed therein the cassettes 14 from the preceding white solid printing process, is fed as far as the full-color printing section 3, the hook 46 of the slider 42 of the feed section 38 is protruded into engagement with the associated feed hook hole 44. The container vessel 9 is fed in synchronism with the scanning of the printing head 8. After the termination of the full-color printing, the container vessel 9 is fed to the top coat printing section 4 of the next step.

During this time interval, the remaining feed section 39 is adapted for being returned from the position to which the feed section has fed the container vessel 9 as far as the printing section 4, at a speed higher than the feed speed during printing, to an initial position, in which the container vessel 9 is positioned in readiness for the next printing. During this movement, the tray feed hook 47 is retracted from the associated slider 43. Consequently, by the alternate feed operations by the two feed sections 38, 39, the container vessels 9, having housed therein the cassettes 14, on which the solid white printing has been completed, may be continuously transported without interruption as far as the top coating printing section 4 of the next step.

The transport unit 10 is provided with stop devices 50, 51 for halting the container vessels 9 at a pre-set position. These stop devices 50, 51 include paired slide rails 52, 53; 54, 55 mounted on either sides of the transport rails 36, 37 at right angles to the transport rails 36, 37, and paired positioning members 56, 57; 58, 59 slid on these slide rails 52, 53; 54, 55 for positioning the container vessels 9, respectively. The positioning members 56, 57; 58, 59 are slid on the slide rails 52, 53; 54, 55, respectively, into abutment with the corners of the container vessels 9 for regulating the position of the container vessels 9. The stop devices 50, 51 include a portion of positioning the container vessels 9 transported from the white solid printing section 2 to the full-color printing section 3 at the full-color printing position and a top coat printing portion for top coat printing at the printing section 4 of the next step.

Figure 6:
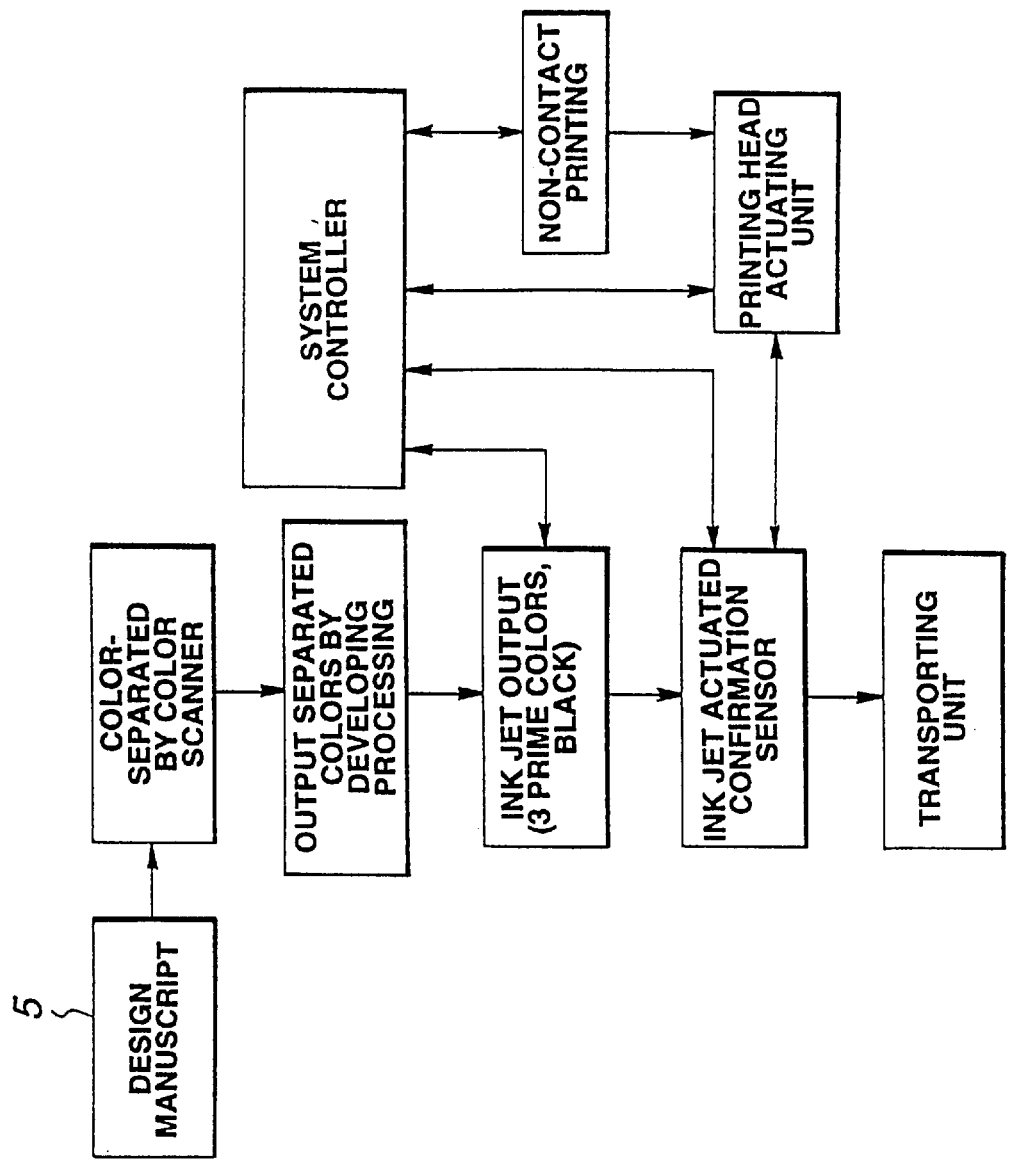
FIG. 6 is a flow chart for illustrating the operation of the full-color printing section.

The operation at the above-described full-color printing section 3 is performed in accordance with the flow chart shown in FIG. 6. First, the design manuscript 5, on which a predesigned color picture pattern is drawn, is read by the scanner 11, and the thus read picture information is color-separated on a pixel basis. Alternatively, the picture information as graphically designed by a word processor or the computer 12 is directly outputted at the image processing unit 7. Still alternatively, the image information or the picture information stored in the magnetic disk cartridge 13 is directly outputted at the image processing unit 7.

The color manuscript digital signals, color-separated on a pixel basis, are color-separated for R, G and B by the image processing unit 7 and stored in a memory within the image processing unit 7. The color-separated digital signals, as printing data, are read from the memory and outputted to the printing head 8, at the same time as an actuating signal is issued for actuating the transporting unit 10 for transporting the container vessels 9 having the cassettes 14 housed therein.

At this time, the printing head 8, head actuating unit 15 and the transport unit 10 are controlled by a system controller 62 made up of a pair of control boxes 60, 61 connected to the image processing unit 7 as shown in FIG. 5 so that the container vessels 9 are fed in synchronism with the movement of the printing head 8. A detection output is also issued at this time from the profiling sensors 21, 22 provided in the printing head 8 to the system controller 62. With the output signal of the system controller 62, the head actuating unit 15 is controlled so that the distance of the printing head 8 relative to the cassette 14 is maintained at a constant value.

Then, under the controlled state, the each color ink is selected and ejected from the distal end of the nozzle provided in the printing head 8 for performing full-color printing on the cassette 14, based on the image information from the scanner 11. Ultimately the printed surface is finished by the pressure roll 63 to complete the printing.

The solid printing section 2 for solid white printing is constituted similarly to the printing section 3. That is, the image or picture information stored in the magnetic disk cartridge 13 is directly outputted to the computer 12, the information from which is outputted to the memory of the image processing unit 7. White solid printing is made by the printing head 8 on the cassettes 14, based on the output signals read from the memory of the image processing unit 7, as the non-contact printing head 8 and the container vessels 9 are operated in synchronism with each other under control by the system controller 62.

The white solid printing is performed by way of surface preparation for full-color printing of the next step. For the whiter solid printing, the ink composed of the white-colored pigment containing high-density anchoring agents, for example, is applied on the cassette 14 as the printing object, by way of printing. Since the cassette 14 itself is usually of the grayish to black color, it is necessary to perform white solid printing about four times in consideration of light emitting performance for color printing. The picture information includes a shell window producing patterns if the printing object is the cassette 14.

Figure 19:
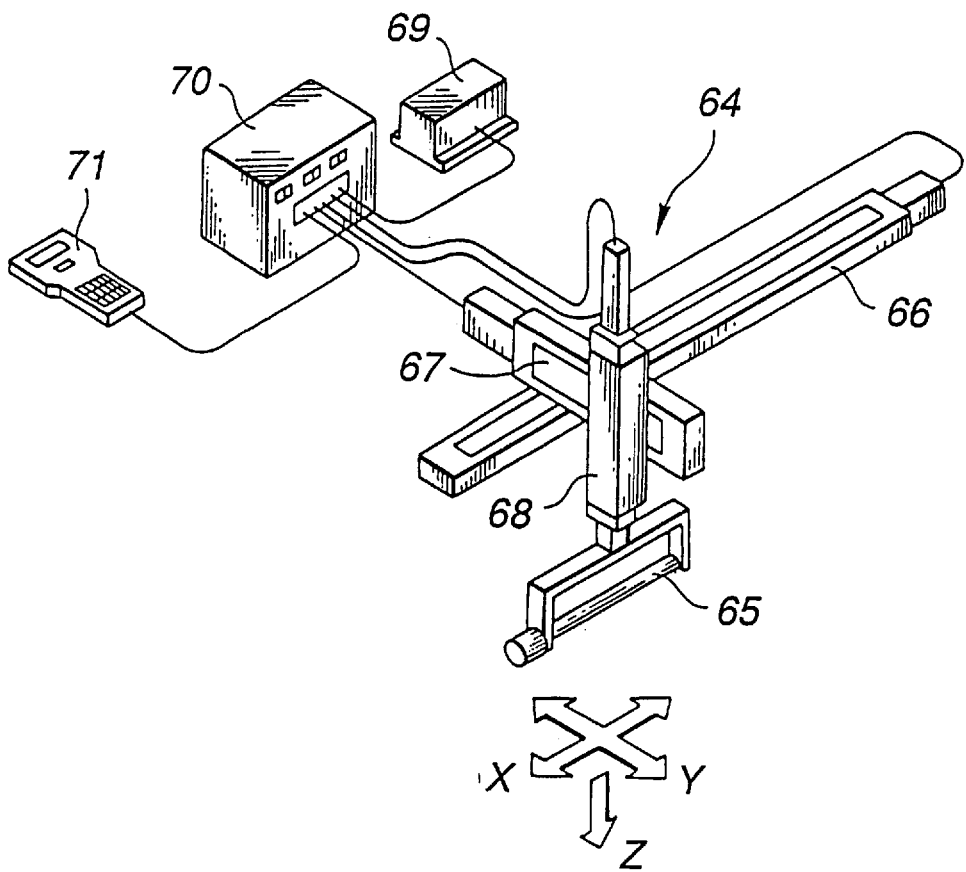
FIG. 19 is a perspective view showing a handling section.

The white solid printing section 2 includes, above all, a handling unit 64 for transporting the container vessels 9, having housed therein the cassettes 14 to be supplied to the supply section 1, as far as the printing section 2. The handling unit 64 includes a handling portion 65 for drawing air out of the container vessel 9 under vacuum, as shown in FIG. 19. The handling portion 65 is adapted to be moved along a first rail 66 in a direction shown by an arrow X in FIG. 19 and along a second rail 67 at right angles to the first rail 66 in a direction shown by an arrow Z in FIG. 19. The handling portion 65 is adapted for performing a three-dimensional movement in the directions shown by arrows X, Y and Z in FIG. 17 under control by a controlling section made up of a sequencer 69 and a controller 70. Thus the container vessels 9, supplied to the supply section 1, are handled and transported to the printing section 2 by the moving operation by the handling portion 65. Meanwhile, the operation by the handling portion 65 is performed by a remote control unit 71 connected to the controller 70.

The top coat printing section 4 is constituted similarly to the printing section 3. That is, the image or picture information stored in the magnetic disk cartridge 13 is directly outputted to the computer 12, the information of which is outputted to the memory of the image processing unit 7. The non-contact printing head 8 and the container vessels 9 are operated in synchronism with each other, based on the output signals as read from the memory of the image processing unit 7, under control by the system controller 62, for applying top coat printing on the cassettes 14. The top coat printing is an processing operation of forming a transparent protective film for improving characteristics of the full-color printed picture design, such as resistance to alcohol or scratch-proofness.

Figure 22:
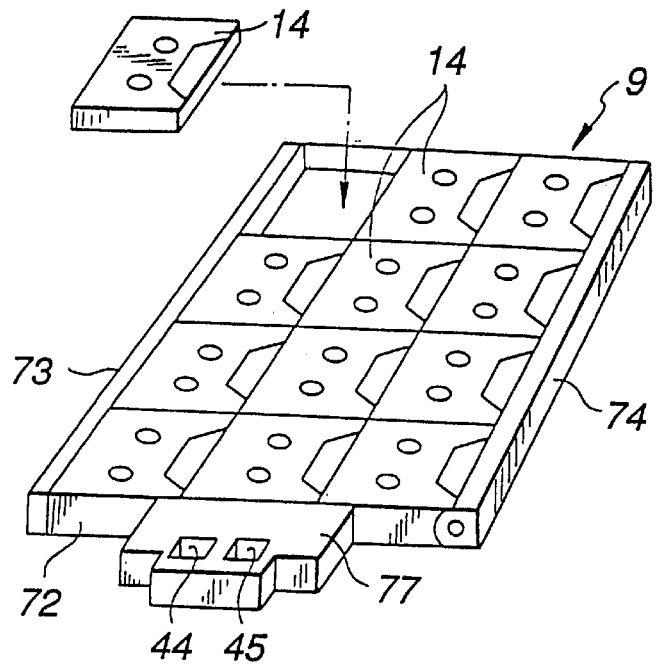
FIG. 22 is a perspective view showing a container vessel employed for clamping cassettes.
Figure 23:
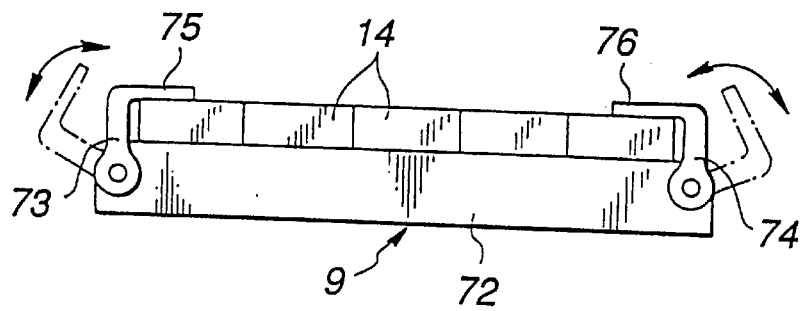
FIG. 23 is a side view showing the container vessel employed for clamping cassettes.

The supply section 1 for printing objects is adapted for laying in stock a large number of the dedicated container vessels 9 having arrayed therein a plurality of cassettes 14 from the molding process. Each container vessel 9 is designed for holding a plurality of, herein 12 cassettes 14, such as video cassettes, therein. Each of the cassettes includes a tray main member 72 of an A-4 format copy sheet size, having housed therein a tape having a tape width of 8 mm, with the cassettes 14 being clamped together by a pair of clamps 73, 74, as shown in FIGS. 22 and 23. These clamps 73, 74 are rotatably mounted along both lateral edges of the tray member 72 and include key-shaped end retainers 75, 76 for retaining the printing surfaces of the cassettes 14. The clamps 73, 74 are perpetually biased by torsion springs, not shown, in a direction of retaining the cassettes 14. The tray main member 72 is provided with a transport engaging section 77 comprised of feed hook through-holes 44, 45 engaged by the tray feed hooks 46, 47 of the transport unit 10.

Figure 24:
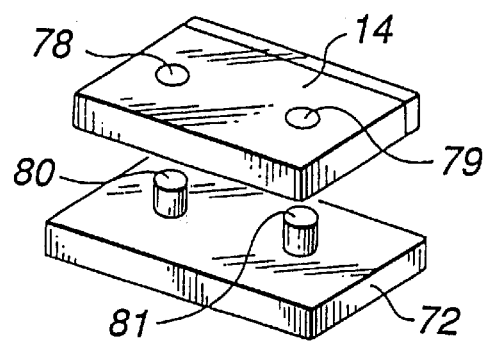
FIG. 24 is a perspective view showing an example of how a cassette may be positively positioning in the container vessel through the use of positioning pins provided on a tray main member.

For assuring reliable loading of the cassettes 14 on the container vessels 9, positioning pins 80, 81 engaged in through-holes 78, 79 for reel hubs may be set on the tray main member 72 in register with the through-holes 78, 79 for the reel hubs, formed in the cassette 14, as shown for example in FIG. 24.

Figure 20:
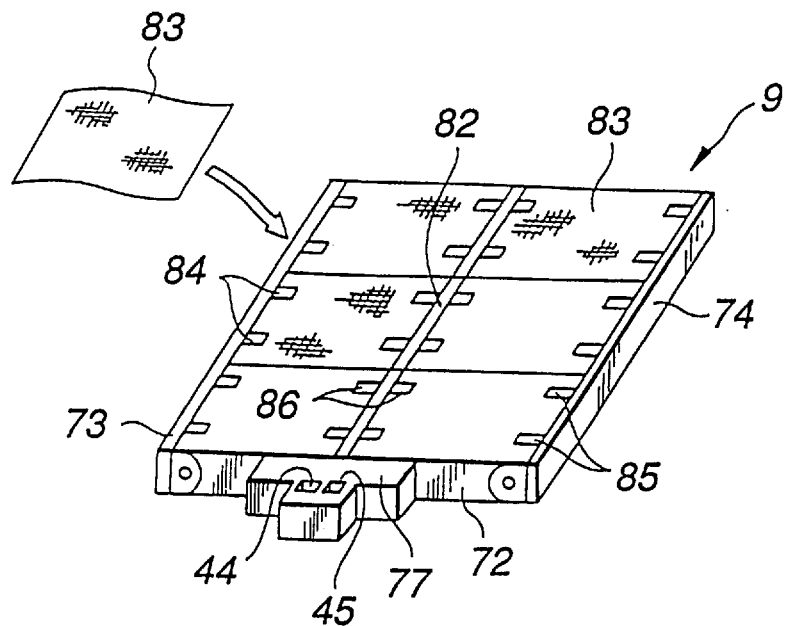
FIG. 20 is a perspective view showing a container vessel employed for clamping paper sheets.
Figure 21:
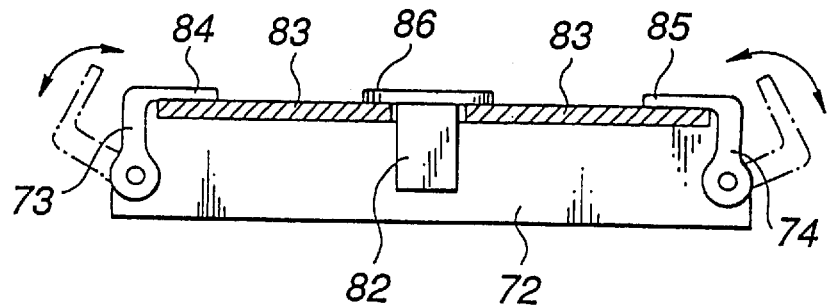
FIG. 21 is a side view showing the container vessel employed for clamping paper sheets.

Meanwhile, when full-color printing a paper sheet 83, such as a thin paper sheet or a carton board, the container vessel 9 as shown in FIGS. 20 and 21 is employed. With such container vessel 9, the clamps 73, 74 movable by a torsion spring are provided on both lateral edges of the tray main member 72, and a fixed clamp 82 included a plate spring is provided at a mid part of the tray main member 72. These clamps 73, 74 and the fixed clamp 82 are provided with retainers 84, 85 and 86 for clamping the paper sheets 83, respectively. It is possible with the container vessel 9 to retain the paper sheet having the size or thickness outside of the standard values.

Figure 25:
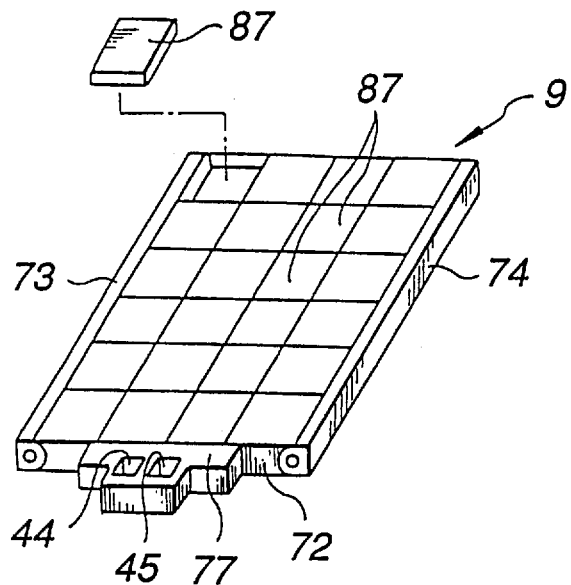
FIG. 25 is a perspective view showing a container vessel employed for clamping sheets of plastic.

For full-color printing a plastic sheet 87, the container vessel 9 for containing the cassettes 14 is used in combination with the plastic sheets 87, as shown in FIG. 25.

Figure 29:
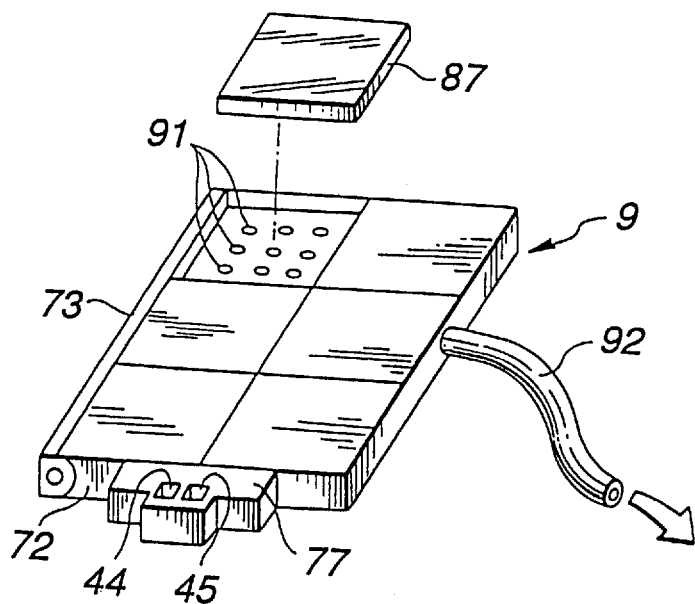
FIG. 29 is a perspective view showing a container vessel in which sheets of plastic are attracted under vacuum by a plurality of suction holes formed in the tray main member.
Figure 30:
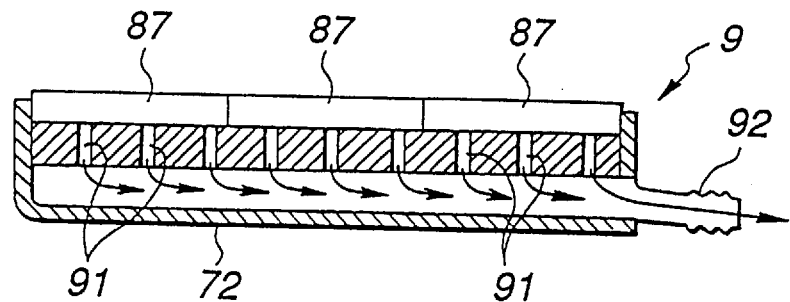
FIG. 30 is a cross-sectional view showing the container vessel in which the sheets of plastic are attracted under vacuum by a plurality of suction holes formed in the tray main member.

For assuring reliable loading of the plastic sheets 87 on the container vessel 9, plural vacuum suction holes 91 may be formed in the tray main member 72 and the interior of the tray main member is evacuated via these vacuum holes 91 for holding the cassettes 14 by the tray main member 72 under vacuum, as shown in FIGS. 29 and 30. A vacuum hose 92 may be led out of one lateral surface of the tray main member 72.

Figure 31:
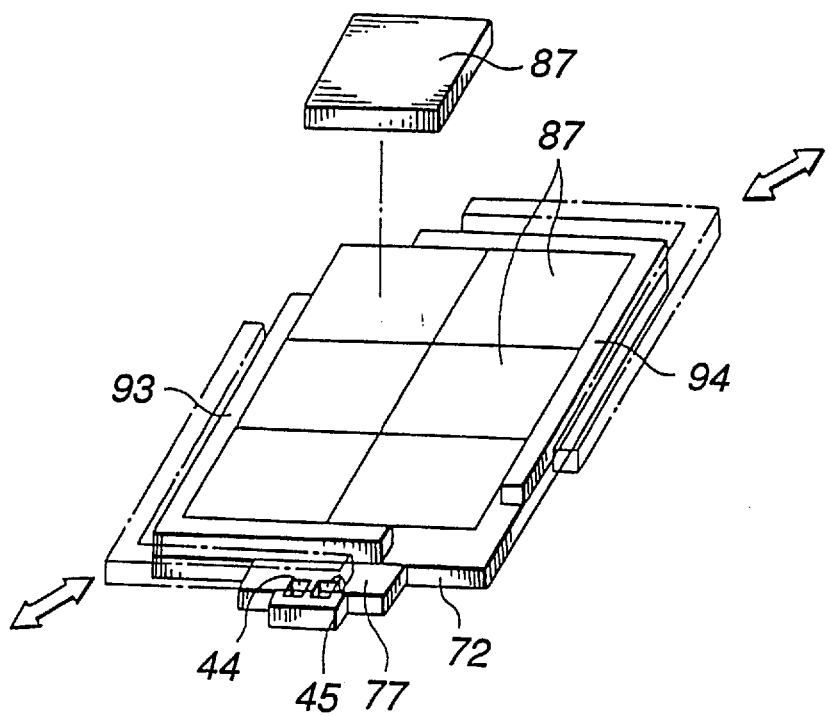
FIG. 31 is a perspective view showing a container vessel in which movable clamps are provided at diagonal portions of the tray main member.

For securing the plastic sheets 87 to the container vessel 9, the diagonal portions of the container vessel 9 may be provided with L-shaped movable clamps 93, 94 which may be moved by springs, as shown in FIG. 31, and by means of which the plastic sheets may be fixed in position.

Figure 26:
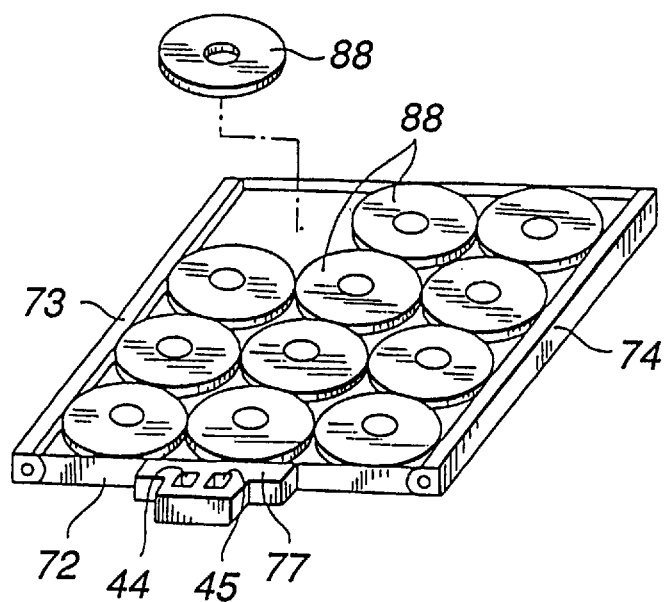
FIG. 26 is a perspective view showing a container vessel employed for clamping discs.
Figure 27:
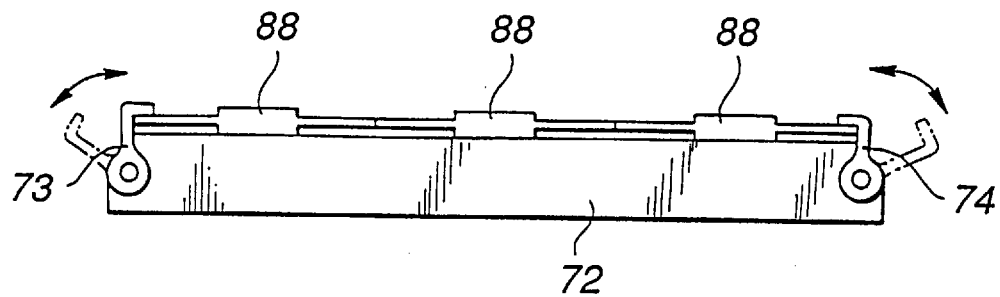
FIG. 27 is a side view showing the container vessel employed for clamping discs.
Figure 28:
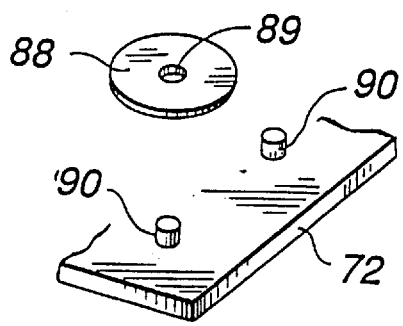
FIG. 28 is a perspective view showing an example of an arrangement for positively positioning a disc in the container vessel.

For full-color printing on a disc-shaped printing object 88, such as the optical object or the magneto-optical disc, the container vessel 9 for housing the cassettes 14 therein as described above may be employed, and the disc 88 may be arrayed as shown in FIGS. 25 and 26. For positively loading the disc 88 in the container vessel 9, a positioning pin 90 may be set at a point on the tray main member 72 in register with a center opening 89 formed in the disc 88, as shown for example in FIG. 28.

With the above-described printing system, the white solid printing, full-color printing and top coat printing are performed consecutively in the following manner.

First, plural cassettes 14 from the molding process are arrayed on the container vessel 9 and clamped.

A large number of container vessels 9 in stock are handled from the supply section 1 and transported to the printing section for white solid printing.

In the printing section 2, white solid printing is performed in a contact-free manner at the designated areas of the cassettes 14 on the basis of the image information or the picture information from the magnetic disk cartridge 13, outputted from the computer 12, so that the scanning of the printing head 8 is synchronized with the feed movement of the container vessels 9.

After the end of the white solid printing, the container vessels 9 are fed by the transport unit 10 to the printing section 3 of the next step.

In the printing section 3, full-color printing is performed in a contact-free manner on designated portions of the cassettes 14, on the basis of the picture information read by the scanner 11, so that the scanning of the printing head 8 is synchronized with the feed movement of the container vessels 9.

After the end of the white solid printing, the container vessels 9 are transported by the transporting unit 10 to the printing section 4 of the ultimate step.

In the printing section 4, a top coat layer is formed in the full-color printed areas of the cassettes, on the basis of the image or picture information from the magnetic disk cartridge 13, outputted from the computer 12, in a contact-free manner, so that the scanning of the printing head 8 is synchronized with the fed movement of the container vessel 9.

Ultimately, the printed surface is finished by the pressure roll 63 to complete the printing.

Figure 16:
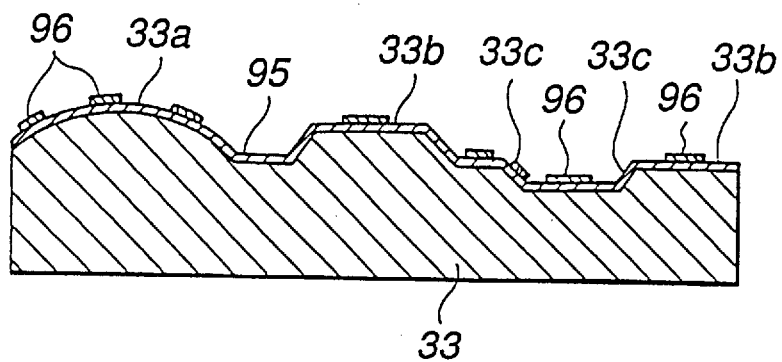
FIG. 16 is a cross-sectional view showing white solid printing and full-color printing on a profiled printing object.

If the profiled plastic sheet 33 is taken as an example of the printed object, a white solid layer 95 is formed on the curved surface 33a, recessed and convexed surface 33b and the inclined surface 33c, a full-color printed letter 96 or the like is formed on the solid layer and a top coat layer, not shown, is formed on the letter 96 and the white solid layer 95, as shown in FIG. 16. The same may be said of the cassette 14, herein not shown, in which case full-color printed letters 96 are formed on the solid layer 95 and a top coat layer is formed on the letter 96 and the solid layer 95.

INDUSTRIAL APPLICABILITY

It is apparent from the above, with the printing method according to the present invention, signals read from the image reader are transformed into a pre-set picture and the information transformed into the picture is supplied to a non-contact printing head, or alternatively, the replay signals reproduced from a recording medium on which the picture information is recorded are transformed into picture signals which are supplied to the non-contact printing head to effect printing on the printing object. Consequently, printing may be made directly on the printing object with the printing head on the basis of the output picture information.

Consequently, the laborious operation of mastering, master exchange, color master registration, ink color or ink viscosity adjustment, which has so far been necessary, may be eliminated to improve productivity and production yield significantly. Besides, since the printing head is not contacted with the printing object, printing may be made on both the hard printing object and on the soft printing object without applying an external pressure on the printing object. Besides, since the picture is outputted, color balance may be automatically achieved by digital duplication, while the numeric processing is enabled to simplify the printing significantly.

On the other hand, since the vertically downward ejection type ink-jet printing head is employed as the non-contact printing head, a so-called drop curve is not exhibited by the trajectory of ink particles, so that, even if the printing head is secured to the printing object, printing of picture patterns or letters may be made satisfactorily on the surface of the printing object, such as the planar surface, recessed surface for labelling, convexed surface, R-surface or the inclined surface.

On the other hand, with the printing device according to the present invention, since the non-contact printing head has its height relative to the printing object controlled on the basis of a detection output from the detection means detecting the recesses or troughs of the printing object, printing may be made at all times with the correct distance between the printing head and the printing object, such that printing may be made continuously from the planar area onto the recessed surface, convexed surface, inclined surface, curved surface, elliptical area or the polygonal area, without producing color fluctuations, color extinction or blurred letter edges, despite the presence of warping, bends or irregularities on the printed object.

Besides, with the printing head according to the present invention, since detection means is provided in the non-contact printing head for detecting irregularities of the printing object, the printing head height may be perpetually maintained constant relative to the printing object depending on the detected irregularities. Consequently, the ink film thickness may be transformed into numerical values to assure high quality printing.

In addition, with the container vessel according to the present invention, a plurality of printing objects may be held in position so that printing may be made on a number of printing objects simultaneously. Different color picture patterns delineated on the design manuscript 5 may be read by the color CCD scanner and printed by a non-contact printing head using such container vessel to allow different picture patterns to be printed on plural printing objects so that small quantity multiple variety printing or simultaneous printing of different designs may be performed efficiently.

I claim:

1. A cassette comprising:

a cassette main member having recessed and convexed areas on a surface on which printing is to be formed, said cassette main member having a recording medium housed therein;

a first printed layer formed continuously between upstanding wall sections of the recessed and convexed areas of the cassette main member and bottom surfaces of said recessed areas or top surfaces of said convexed areas, said first printed layer being formed by ejecting ink vertically downward from a first ink jet printing head;

a second printed layer formed by color printing based on picture information indicative of the color printing to be formed on said first layer, said second printed layer being formed by ejecting ink vertically downward from a second ink jet printing head, and a third protective layer formed over said second printed layer, said third protective layer being formed by ejecting ink vertically downward from a third ink jet printing head.

\* \* \* \* \*